United States Patent
Fan et al.

(10) Patent No.: US 12,544,771 B2
(45) Date of Patent: Feb. 10, 2026

(54) ELECTRODE APPARATUS FOR CREATING A NON-UNIFORM ELECTRIC FIELD TO REMOVE POLARIZED MOLECULES IN A FLUID

(71) Applicants: Board of Trustees of Michigan State University, East Lansing, MI (US); Fraunhofer USA, East Lansing, MI (US)

(72) Inventors: Qi Hua Fan, Okemos, MI (US); Keliang Wang, Okemos, MI (US)

(73) Assignees: Board of Trustees of Michigan State University, East Lansing, MI (US); Fraunhofer USA Inc., Plymouth, MI (US)

( * ) Notice: Subject to any disclaimer, the term of this patent is extended or adjusted under 35 U.S.C. 154(b) by 840 days.

(21) Appl. No.: 17/431,989

(22) PCT Filed: Feb. 18, 2020

(86) PCT No.: PCT/US2020/018585
§ 371 (c)(1),
(2) Date: Aug. 18, 2021

(87) PCT Pub. No.: WO2020/172132
PCT Pub. Date: Aug. 27, 2020

(65) Prior Publication Data
US 2021/0379602 A1 Dec. 9, 2021

Related U.S. Application Data

(60) Provisional application No. 62/807,797, filed on Feb. 20, 2019.

(51) Int. Cl.
*B03C 5/02* (2006.01)
*B03C 5/00* (2006.01)
(Continued)

(52) U.S. Cl.
CPC ............. *B03C 5/026* (2013.01); *B03C 5/005* (2013.01); *C02F 1/48* (2013.01);
(Continued)

(58) Field of Classification Search
CPC .......... C02F 1/469; C02F 1/4696; C02F 1/48; C02F 2101/36; C02F 2307/06;
(Continued)

(56) References Cited

U.S. PATENT DOCUMENTS

| | | | | |
|---|---|---|---|---|
| 4,001,102 A | * | 1/1977 | Batha | C02F 1/469 435/173.9 |
| 4,073,712 A | * | 2/1978 | Means | B03C 5/026 204/554 |

(Continued)

FOREIGN PATENT DOCUMENTS

| | | |
|---|---|---|
| CA | 3121975 A1 | 12/2021 |
| CN | 102826632 A | 12/2012 |

(Continued)

OTHER PUBLICATIONS

Li et al. ("Enhanced Adsorption of PFOA and PFOS on Multiwalled Carbon Nanotubes under Electrochemical Assistance" Environ. Sci. Technol. 2011, 45, 8498-8505 and SI) (Year: 2011).*

(Continued)

*Primary Examiner* — Luan V Van
*Assistant Examiner* — Alexander R. Parent
(74) *Attorney, Agent, or Firm* — Harness, Dickey & Pierce, P.L.C.

(57) ABSTRACT

An electrode apparatus and method remove a polarized molecule in a fluid. In another aspect, a non-uniform electric field is created between an anode and a cathode, the fluid flows within a gap between the cathode and the anode, and (Continued)

the polarized molecule is driven by an electrostatic force to and adsorbed on the anode without experiencing a chemical reaction.

31 Claims, 8 Drawing Sheets

(51) Int. Cl.
    *C02F 1/461*           (2023.01)
    *C02F 1/48*             (2023.01)
    *C02F 101/36*         (2006.01)

(52) U.S. Cl.
    CPC .............. *C02F 2001/46138* (2013.01); *C02F 2001/46161* (2013.01); *C02F 2001/46171* (2013.01); *C02F 2101/36* (2013.01); *C02F 2201/009* (2013.01); *C02F 2307/06* (2013.01)

(58) Field of Classification Search
    CPC ................... C02F 1/463; C02F 1/4691; C02F 2001/46171; C02F 2001/46138; C02F 2001/46161; B03D 5/005; B03D 5/026; B03C 3/04; B03C 3/06; B03C 3/34; B03C 3/40; B03C 3/45; B03C 3/49; B03C 5/026; B03C 5/005; B03C 5/022
    USPC ........................................ 204/264, 450, 547
    See application file for complete search history.

(56) References Cited

U.S. PATENT DOCUMENTS

| | | | |
|---|---|---|---|
| 4,247,307 A * | 1/1981 | Chang ........................ | B03C 3/41 95/79 |
| 5,425,858 A | 6/1995 | Farmer | |
| 5,753,100 A | 5/1998 | Lumsden | |
| 6,228,266 B1 | 5/2001 | Shim | |
| 7,049,615 B1 | 5/2006 | Browne | |
| 8,491,768 B2 * | 7/2013 | Ai ............................ | B03C 5/026 977/840 |
| 9,040,108 B2 * | 5/2015 | Wang ....................... | B03C 5/026 204/554 |
| 9,545,652 B2 | 1/2017 | Zuo et al. | |
| 9,754,733 B2 | 9/2017 | Fan et al. | |
| 9,765,271 B2 | 9/2017 | Myrick | |
| 9,776,894 B2 | 10/2017 | Servida | |
| 10,183,875 B2 * | 1/2019 | Niksa ...................... | C02F 1/4674 |
| 10,807,888 B2 * | 10/2020 | Paranthaman ...... | C02F 1/46109 |
| 11,027,990 B2 | 6/2021 | Mededovic et al. | |
| 2004/0108222 A1 | 6/2004 | Gattrell et al. | |
| 2005/0183964 A1 * | 8/2005 | Roberts ..................... | C02F 1/48 205/742 |
| 2006/0091015 A1 | 5/2006 | Lau | |
| 2006/0201868 A1 * | 9/2006 | Simmons ................ | B03C 5/024 204/600 |
| 2009/0057133 A1 | 3/2009 | Kouznetsov | |
| 2010/0252411 A1 | 10/2010 | Awaji et al. | |
| 2011/0025306 A1 * | 2/2011 | Ackermann ........ | C02F 1/46109 204/671 |
| 2011/0185705 A1 | 8/2011 | Shaw et al. | |
| 2012/0211367 A1 | 8/2012 | Vecitis | |
| 2013/0026096 A1 | 1/2013 | Nitta et al. | |
| 2013/0032491 A1 * | 2/2013 | Nitta ....................... | C02F 1/4672 204/263 |
| 2014/0027288 A1 | 1/2014 | Nyberg et al. | |
| 2014/0210344 A1 | 7/2014 | Foret | |
| 2015/0122741 A1 * | 5/2015 | Eckelberry ............. | C02F 1/463 204/272 |
| 2015/0353386 A1 | 12/2015 | Jin et al. | |
| 2016/0228844 A1 | 8/2016 | Mededovic et al. | |
| 2017/0297926 A1 | 10/2017 | Nickelsen et al. | |
| 2017/0309888 A1 | 10/2017 | Yu et al. | |
| 2018/0222781 A1 | 8/2018 | Liu et al. | |
| 2018/0319666 A1 | 11/2018 | Jin et al. | |
| 2019/0016612 A1 | 1/2019 | Park et al. | |
| 2019/0366298 A1 | 12/2019 | Fan et al. | |
| 2020/0035456 A1 | 1/2020 | Fan et al. | |
| 2020/0247695 A1 * | 8/2020 | Zhou .................... | C02F 1/46109 |
| 2020/0335311 A1 | 10/2020 | Fan et al. | |
| 2020/0399147 A1 | 12/2020 | Yost et al. | |
| 2020/0407241 A1 | 12/2020 | Dejarme et al. | |
| 2021/0147974 A1 | 5/2021 | Schuelke et al. | |
| 2021/0253452 A1 * | 8/2021 | Horne ...................... | C25B 11/02 |
| 2021/0291138 A1 | 9/2021 | Fan et al. | |
| 2021/0327687 A1 | 10/2021 | Choi et al. | |
| 2022/0013324 A1 | 1/2022 | Fan | |

FOREIGN PATENT DOCUMENTS

| | | |
|---|---|---|
| JP | S5386678 A | 7/1978 |
| JP | 3019526 U | 12/1995 |
| JP | H091151 A | 1/1997 |
| JP | H11319838 A | 11/1999 |
| JP | 2004-28026 A | 1/2004 |
| JP | 2004028026 A | 1/2004 |
| JP | 2005-78935 A | 3/2005 |
| JP | 2008178875 A | 8/2008 |
| JP | 2011246799 A | 12/2011 |
| JP | 2019511363 A | 4/2019 |
| WO | WO-2018/030984 A1 | 2/2018 |
| WO | WO-2018/035474 A1 | 2/2018 |
| WO | WO-2018/097875 A1 | 5/2018 |
| WO | WO-2018/136502 A1 | 7/2018 |
| WO | WO-2018/148559 A1 | 8/2018 |
| WO | WO-2020/205635 A1 | 10/2020 |

OTHER PUBLICATIONS

Hojati-Talemi et al. ("Using oxygen plasma treatment to improve the performance of electrodes for capacitive water deionization" Electrochimica Acta 106 (2013) 494-499) (Year: 2013).*
Jun et al. ("Evaluation of Activated Carbon-Coated Electrode in Electrostatic Precipitator and its Regeneration for Volatile Organic Compounds Removal" Water Air Soil Pollut. (2017) 228 110) (Year: 2017).*
Kim et al. ("Activated Carbon-Coated Electrode and Insulating Partition for Improved Dust Removal Performance in Electrostatic Precipitators" Water Air Soil Pollut. (2015) 226 367) (Year: 2015).*
Kularatna, et al. (2021). "Energy Storage Devices for Renewable Energy-Based Systems-Rechargeable Batteries and Supercapacitors (2nd Ed.)" 6.1 Capacitor Fundamentals p. 181-197 Elsevier 2021 (Year: 2021).*
Chinese Office Action and Search Report for CN Application No. 2020800159505 (dated Aug. 29, 2022).
English Summary of Chinese Office Action.
Zeng Delin, "Powder metallurgy materials", pp. 92-93, metallurgical industry press (Nov. 1989).
Zhou Hao, et al., "High voltage technology," pp. 15-16, Zhejiang University Press (Jun. 2007).
International Search Report and Written Opinion, PCT/US2020/018585 (May 7, 2020).
Singh, R., et al., "Breakdown Products from Perfluorinated Alkyl Substances (PFAS) Degradation in a Plasma-Based Water Treatment Process," Environmental Science & Technology, vol. 53, p. 2731-2738 (2019).
Nau-Hix, C., et al., "Field Demonstration of a Pilot-Scale Plasma Reactor for the Rapid Removal of Poly- and Perfluoroalkyl Substances in Groundwater," ACS EST Water vol. 1, p. 680-687 (2021).
Li, X., et al., "Enhanced Adsorption of PFOA and PFOS on Multi-walled Carbon Nanotubes under Electrochemical Assistance," Environmental Science and Technology, p. 8498-8505 (Aug. 23, 2011).
Notice of Reasons for Refusal for Japanese Patent Application No. 2021-548657 issued Aug. 2, 2022.

(56) References Cited

OTHER PUBLICATIONS

European Search Report for European Patent Application No. 20760327.5 issued Oct. 21, 2022.

* cited by examiner

ELECTRODE APPARATUS FOR CREATING A NON-UNIFORM ELECTRIC FIELD TO REMOVE POLARIZED MOLECULES IN A FLUID

CROSS-REFERENCE TO RELATED APPLICATION

This application is a National Phase entry of PCT International Application No. PCT/US2020/018585, filed on Feb. 18, 2020, which claims priority to U.S. Provisional Patent Application Ser. No. 62/807,797, filed Feb. 20, 2019. The entire disclosure of the above applications are incorporated by reference herein.

GOVERNMENT RIGHTS

This invention was made with government support under 1700785, 1700787, and 1724941 awarded by the National Science Foundation. The government has certain rights in the invention.

BACKGROUND AND SUMMARY

Per-and-polyfluoroalkyl substances ("PFAS") are a group of man-made chemicals that are very persistent in the environment and human body, which can lead to adverse human health effects. PFAS molecules have been commonly used as stain repellants and fire-fighting foams which were emitted into the air and water by industrial processes used to manufacture fluoro chemicals. PFAS molecules have also entered the ground and surface water through disposal of waste and sewage sludge, and as a result of fire-fighting use.

U.S. Patent Publication No. 2018/0222781 is entitled "Water Purification using Porous Carbon Electrode" which published to Liu et al. on Aug. 9, 2018. This patent publication is incorporated by reference herein. This device uses an electrolysis chemical reaction process to break contaminants into small and stable molecules by using an electric current flowing between parallel electrodes.

In accordance with the present invention, an electrode apparatus and method remove a polarized molecule in a fluid. In another aspect, an electric potential is applied to an anode located within the fluid, the fluid flows within a gap between the anode and a surrounding cathode, and a non-uniform electric field is created between the anode and the cathode. A further aspect causes a polarized molecule in a liquid or gaseous fluid to move toward an anode. In another aspect, an electrically conductive porous material is an anode and is circumferentially surrounded by a grounded cathode with a fluid flowing therebetween and a polarized molecule (such as PFAS or other molecules) in the fluid is driven toward the anode, without causing electric current flowing between the anode and cathode and/or without a chemical reaction to the polarized molecule. In a further aspect, an anode is made of a porous metal and/or a porous activated carbon.

Moreover, another aspect includes a method for manufacturing an anode including making a metallic foil sheet, which may be a porous metal foam, attaching an activated carbon layer to the foil sheet and coiling or bending the foil and activated carbon assembly into a generally cylindrical shape. This method may further include applying an electric field between the foil/carbon anode and a surrounding cathode, flowing a liquid or gaseous fluid between the anode and the cathode, and electrically pulling polarized molecules to the anode without causing an electric current to flow. A further aspect of the present apparatus and method includes a drinking water faucet to which the anode and cathode are attached. Yet another aspect of the present apparatus and method uses the anode and cathode as part of an industrial water fluid treatment piping system. Additional advantages and features will be disclosed in the following description and appended claims, taken in conjunction with the accompanying drawings.

DETAILED DESCRIPTION

Figure 1:
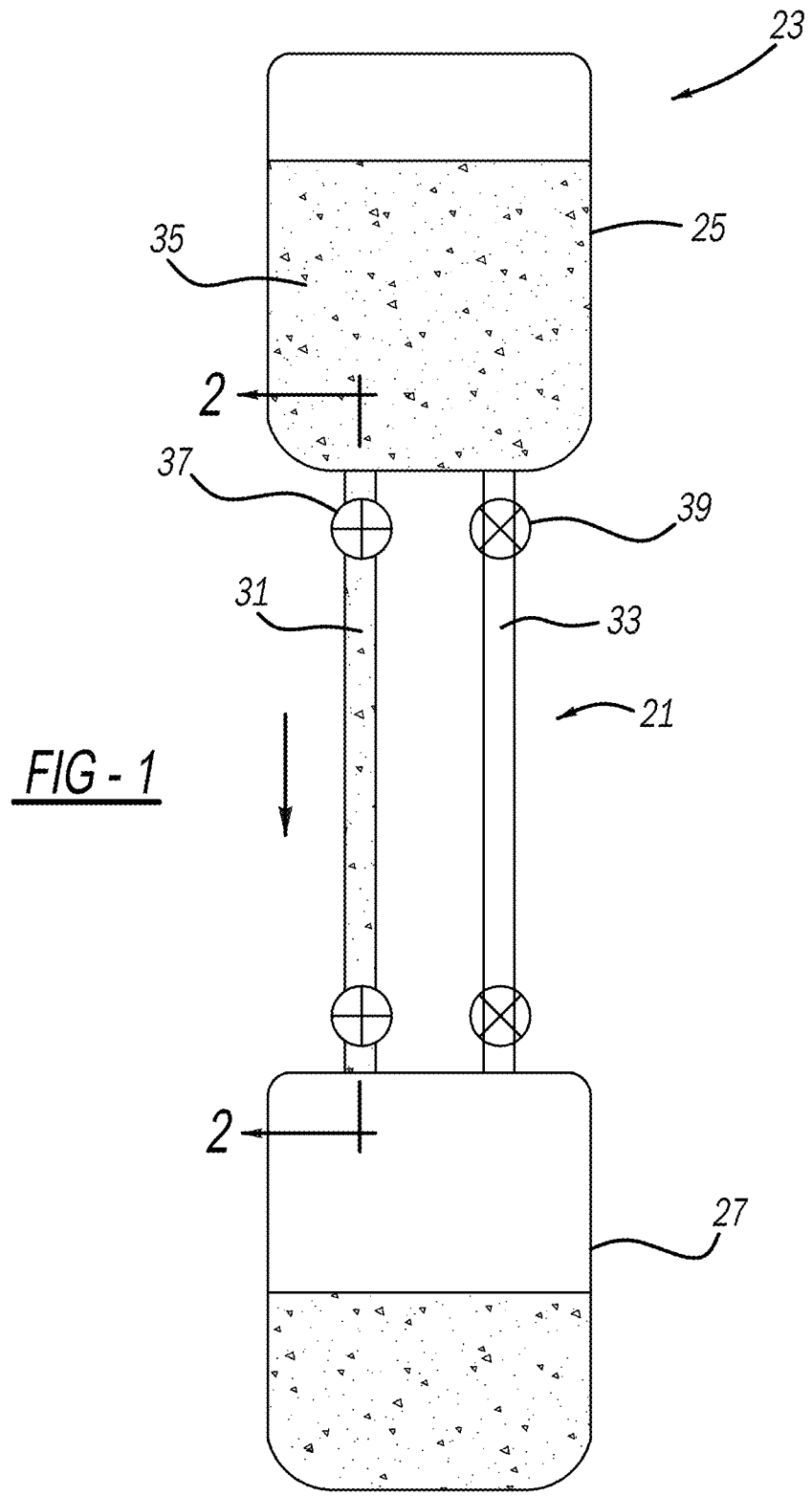
FIG. 1 is a diagrammatic view showing an industrial water treatment apparatus employing the present electrode apparatus.

A first preferred embodiment of an electrode apparatus 21 used in an industrial water treatment system 23 is illustrated in FIGS. 1-4. Water treatment system 23 includes a contaminated water supply reservoir or tank 25, a decontaminated water receiving or holding reservoir or tank 27, and one or more electrode-based precipitator or treatment units 31 and 33. Valves 37 of treatment unit 31 are turned on to allow flow of contaminated water 35 between the tanks while valves 39 of treatment unit 33 may be optionally turned off to stop fluid flow therein, or vice versa, for example if an anode therein needs to be cleaned and/or replaced. Additionally, water pumps, sensors, pipes and other plumbing components may be employed to flow water 35 from tank 25, through treatment units 31 and/or 33, and to tank 27.

More specifically, each precipitator and treatment unit 31 and 33 includes a longitudinally elongated and generally cylindrically shaped cathode electrode 41 which concentrically surrounds a generally cylindrically shaped and longitudinally elongated anode electrode 43 internally located therein. A cylindrical gap 45 concentrically surrounds anode 43 between an outer diameter periphery of the anode and an inner diameter surface of cathode 41, such that the cathode and anode are spaced away from each other to allow water 35 to longitudinally flow in gap 45. The anode preferably has an outer diameter less than half of the inner diameter of the cathode although such a relationship may be varied for different uses.

Anode 43 is preferably a conductive and corrosion resistant rod material 47 with porous structures. Anode 43 can be a metal, such as copper, stainless steel, nickel or an alloy thereof. Alternatively, anode 43 consists of a metal core 47 with a layer of activated carbon 49 on an outside thereof. Activated carbon 49 is preferably treated as is disclosed in PCT International Patent Publication No. WO 2018/136502 entitled "Magnetic Field Enhanced Plasma for Materials Processing" which published to one of the present co-inventors Qi Hua Fan, on Jul. 26, 2018, and U.S. Pat. No. 9,754,733 entitled "Method for Plasma Activation of Biochar Material" which also issued to co-inventor Qi Hua Fan, on Sep. 5, 2017, both of which are incorporated by reference herein. Activated carbon layer 49 has a thickness of at least 1 micron and a surface area greater than 600 $m^2/g$ is preferred. For PFAS adsorption, it is preferred to employ plasma activated carbon with a relatively positive surface potential. Furthermore, cathode 41 is a conductive, corrosion resistant and tubular metallic material, preferably copper but alternately stainless steel, nickel or an alloy thereof.

An electrical circuit 51 electrically connects a direct current power source 53 to an end 55 of anode 43 for supplying positive dc voltage thereto. The preferred voltage range is 1-100 volts and more preferably 3-40 volts, however, greater voltage can be used with other fluids. Another electrical circuit 57 electrically couples an end of cathode 41 to a ground 59. Due to the non-symmetrical nature of the electrodes, for example the fluid-exposed surface area size differences between the smaller outer diameter of anode 43 and the larger inner diameter of cathode 41, a non-uniform electric field is created within gap 45. Although there are electrical potential differences between anode 43 and cathode 41, however, essentially no electrical current flows between these electrodes since the fresh water within gap 45 is a poor electrical conductor and essentially acts as an insulator. There is no current flow corresponding to the transport of PFAS. Thus, there is no electrical current between the electrodes in the water assuming no impurities in the water other than the polarized contaminants to be removed.

Figure 2:
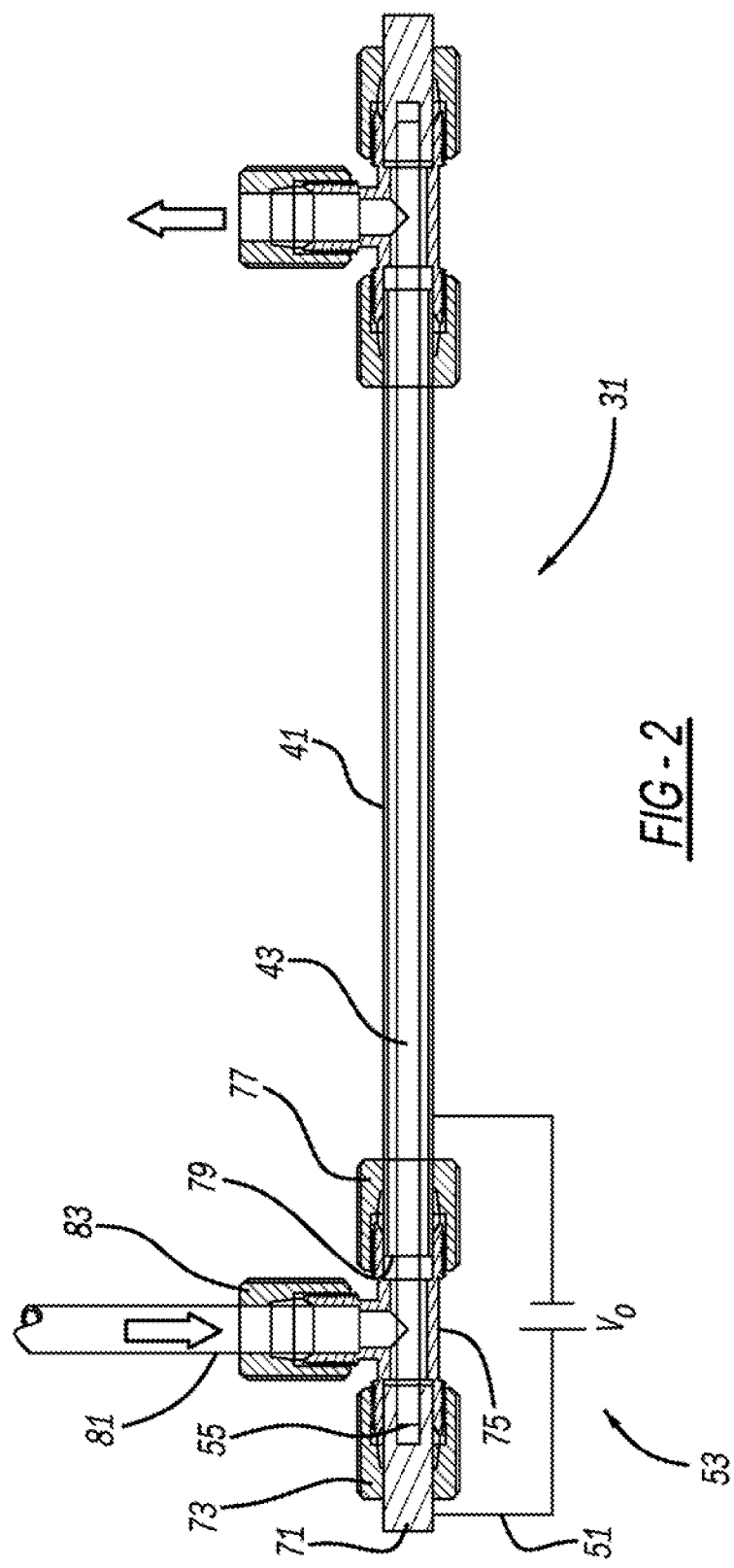
FIG. 2 is a longitudinal-sectional view, taken along line 2-2 of FIG. 1, showing the present electrode apparatus.
Figure 3:
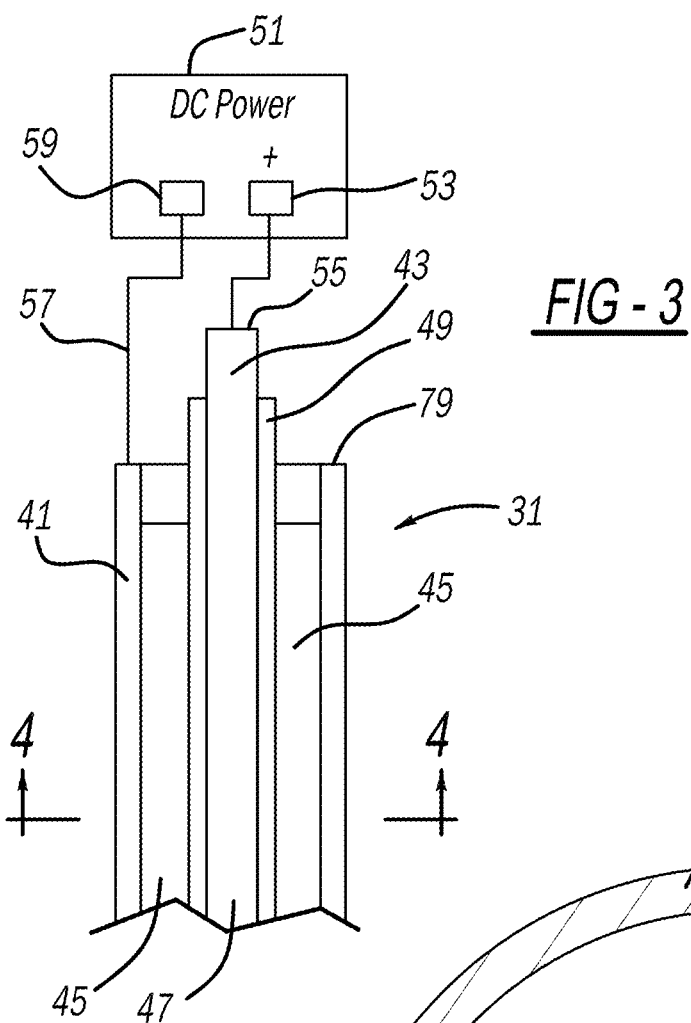
FIG. 3 is a diagrammatic view showing the present electrode apparatus of FIG. 2.

As can best be observed in FIG. 2, an electrical connector 71 retains the associated end 55 of anode 43 within an end-fitting 73. In the present example, end fitting 73 is threadably coupled to a T-pipe junction 75. Furthermore, an intermediate fitting 77 threadably couples an associated end 79 of cathode 41 to pipe junction 75. An additional pipe or contaminated water supply line 81 is coupled to pipe junction 75 via another fitting 83. A similar arrangement is provided on the opposite end of the treatment unit 31. It should be appreciated that the cathode and anode longitudinal lengths and lateral diameters, as well as the flow through area of the gap therebetween, is sized to match the fluid flow rate, the concentration of the polarized molecule contaminants to be removed, and the adsorption capabilities of the anode employed. Regardless, it is envisioned that the longitudinal length of anode 43 will be at least ten times and more preferably at least twenty times an outer diameter thereof.

Figure 4:
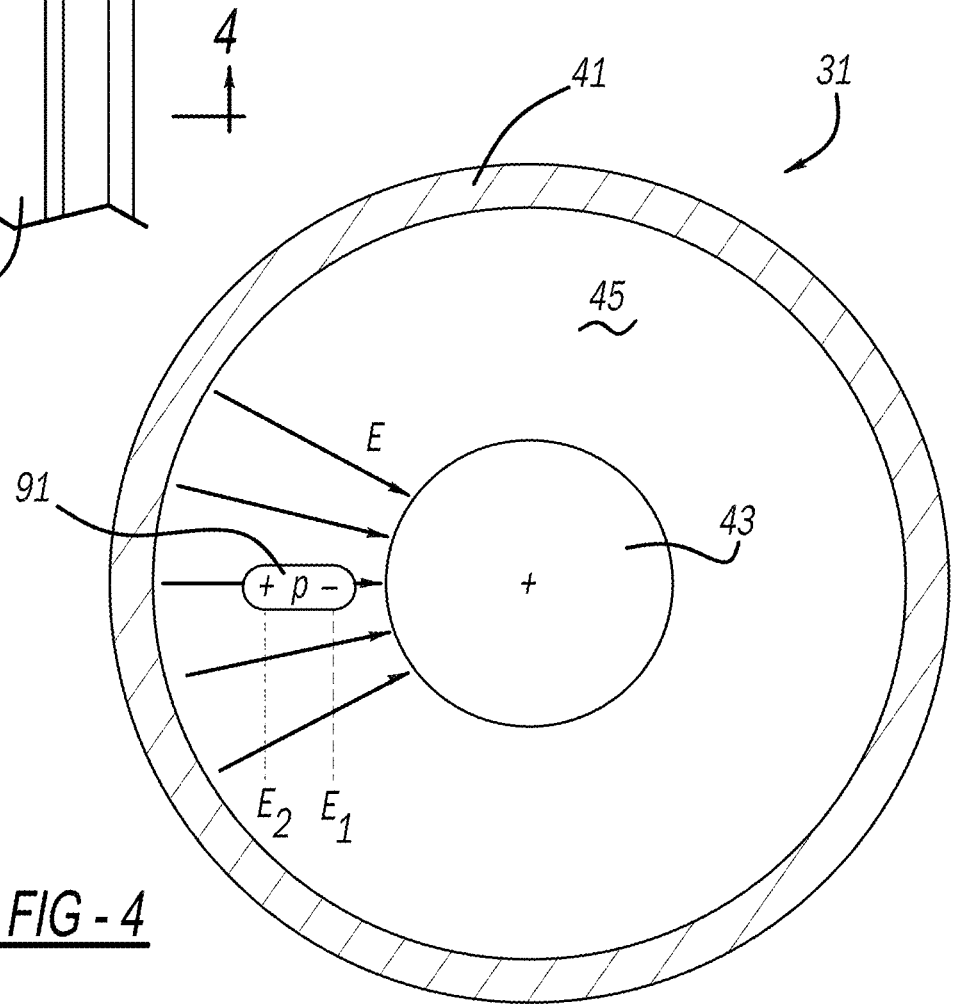
FIG. 4 is a cross-sectional view, taken along line 4-4 of FIG. 3, showing the present electrode apparatus.
Figure 5:
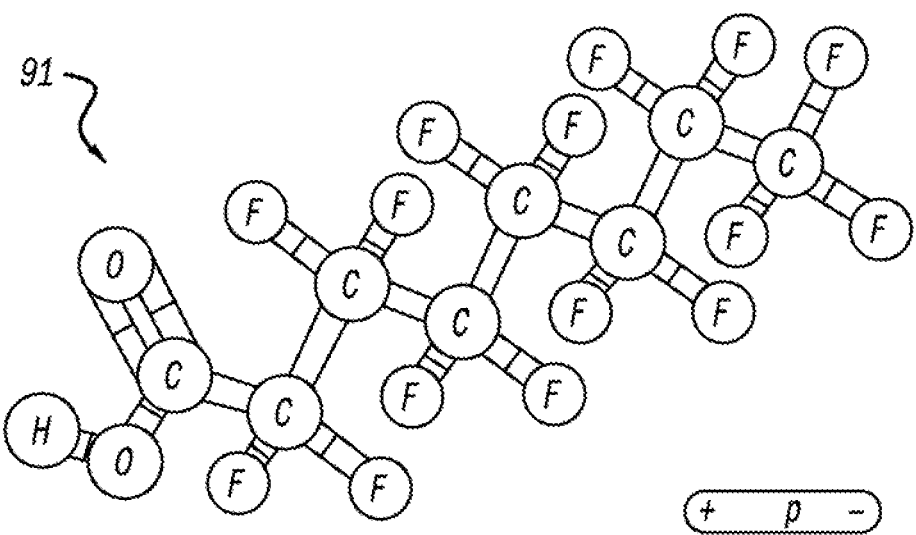
FIG. 5 is a model of a polarized PFAS molecule employed with the present electrode apparatus.

Referring now to FIGS. 4 and 5, the contaminant to be removed by the present electrode apparatus and method is a polarized molecule 91, preferably a PFAS molecule consisting of at least carbon and fluorine atoms. E denotes the non-uniform electric field between anode 43 and cathode 41 which drives or pulls the polarized molecule 91 toward anode 43 which is then adsorbed into the porous anode. It is noteworthy that no chemical reaction or electrolysis is occurring to molecules 91 since no or minimal electrical current is flowing between the electrodes. Thus, anode serves to remove the polarized molecule contaminants from the water as the water flows past the anode. No additional filtering or chemical reactions should be necessary to remove these polarized molecules from the flowing drinking water. Periodically, the contaminant-rich anode will be removed and either replaced or cleaned.

It is alternately envisioned that polarized molecules other than PFAS may be removed by use of the present electrode apparatus and method. Moreover, polarized molecules may alternately be removed from other liquid and gaseous fluids, such as within a combustion smokestack or exhaust pipe. Other polarized molecule contaminants include benzene, carbon dioxide, sulphur dioxide and the like.

Figure 6:
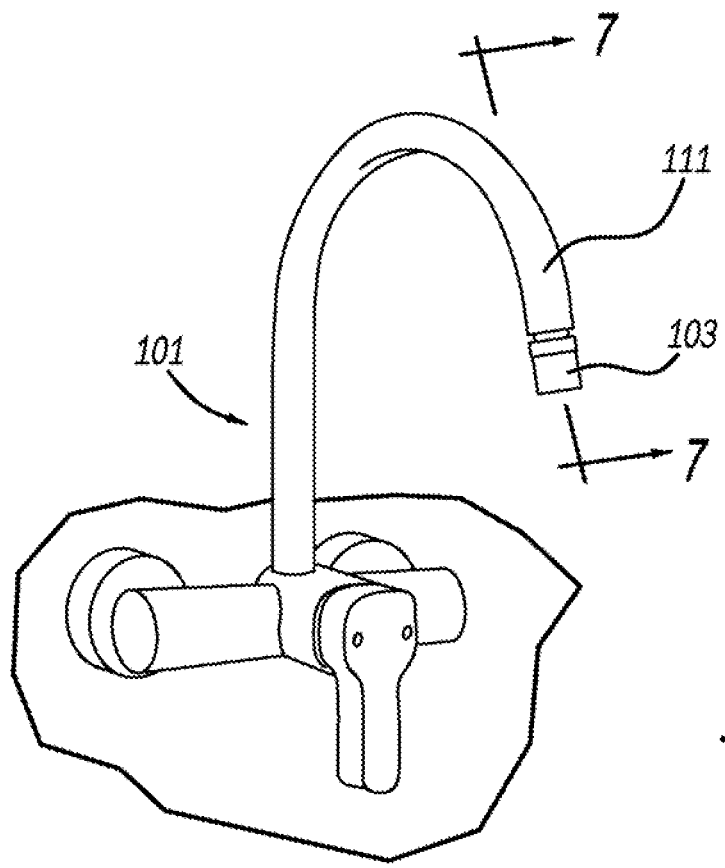
FIG. 6 is a perspective view showing a drinking water faucet apparatus employing the present electrode apparatus.
Figure 7:
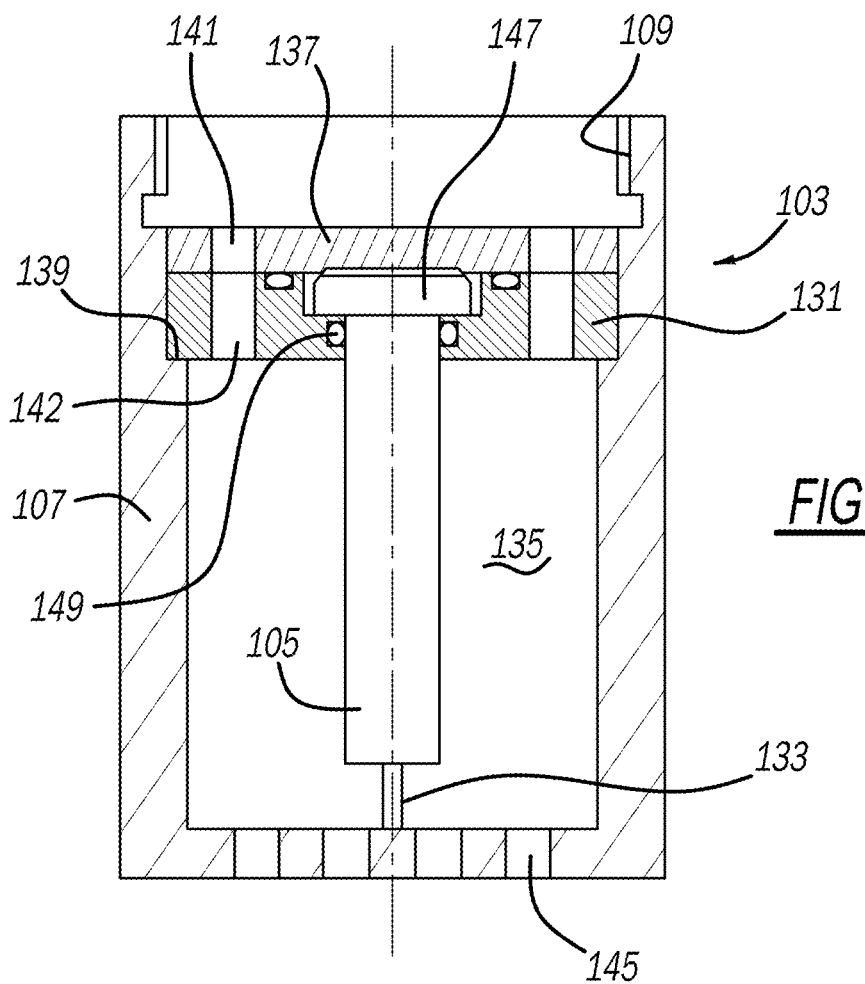
FIG. 7 is a longitudinal-sectional view, taken along line 7-7 of FIG. 6, showing the present electrode apparatus.

A residential implementation of an exemplary second preferred embodiment of the present electrode apparatus and method are illustrated in FIGS. 6 and 7. A residential drinking water faucet 101 includes an adapter 103 adjacent a distal end thereof. Adapter 103 employs an anode electrode 105 and a concentrically surrounding cathode electrode 107, both of which are longitudinally elongated. A threaded coupling 109 removably couples a proximal end of cathode 107 to an outlet pipe 111 of faucet 101. Furthermore, a pair of polymeric insulators 131 and 133 mount and insulate anode 105 within cathode while allowing a water flow gap 135 between the facing outer and inner surfaces of anode 105 and cathode 107, respectively. A polymeric cover plate 137 is also provided to secure insulator 131 within a stepped recess 139 of cathode 107. Cover plate 137 may be attached to the inside of the cathode by threads, adhesive or an interference press-fit. Cover plate 137 includes multiple longitudinally open holes 141, insulator 131 also includes multiple aligned and longitudinally accessible holes 142, and a distal end of cathode 107 additionally includes longitudinally accessible holes 145, to allow drinking water to flow therethrough. A battery power supply 147 is electrically connected to anode 105 and may be retained between insulator 131 and cover plate 137, or in a remote different location with a wire or stamped circuit, to supply electrical voltage to an end of anode 105. O-rings 149 are also employed to seal the various components. The anode and cathode function essentially the same as with the prior industrial configuration for removing polarized molecule contaminants from the drinking water and adsorbing them onto the anode.

Figure 8:
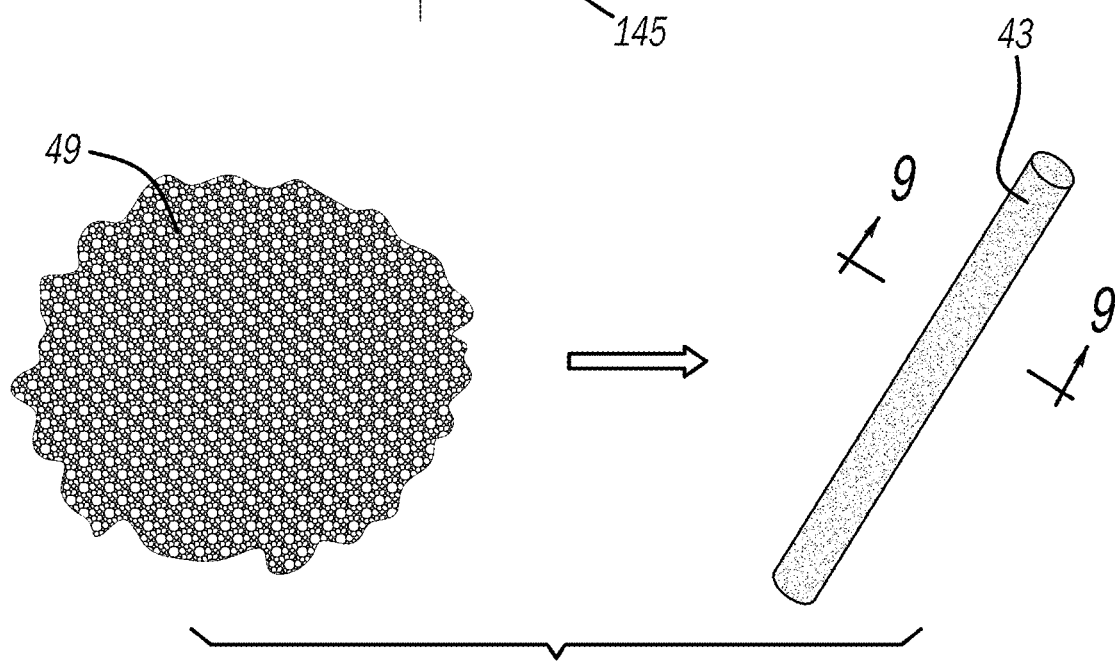
FIG. 8 is a series of perspective views showing a first manufacturing process to make an anode used in the present electrode apparatus.
Figure 9:
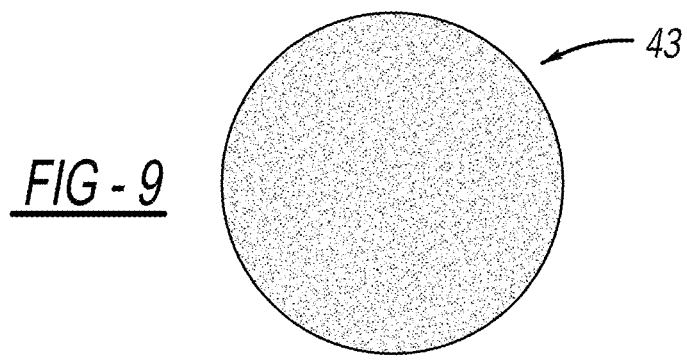
FIG. 9 is a cross-sectional view, taken along line 9-9 of FIG. 8, showing the anode used in the present electrode apparatus.
Figure 10:
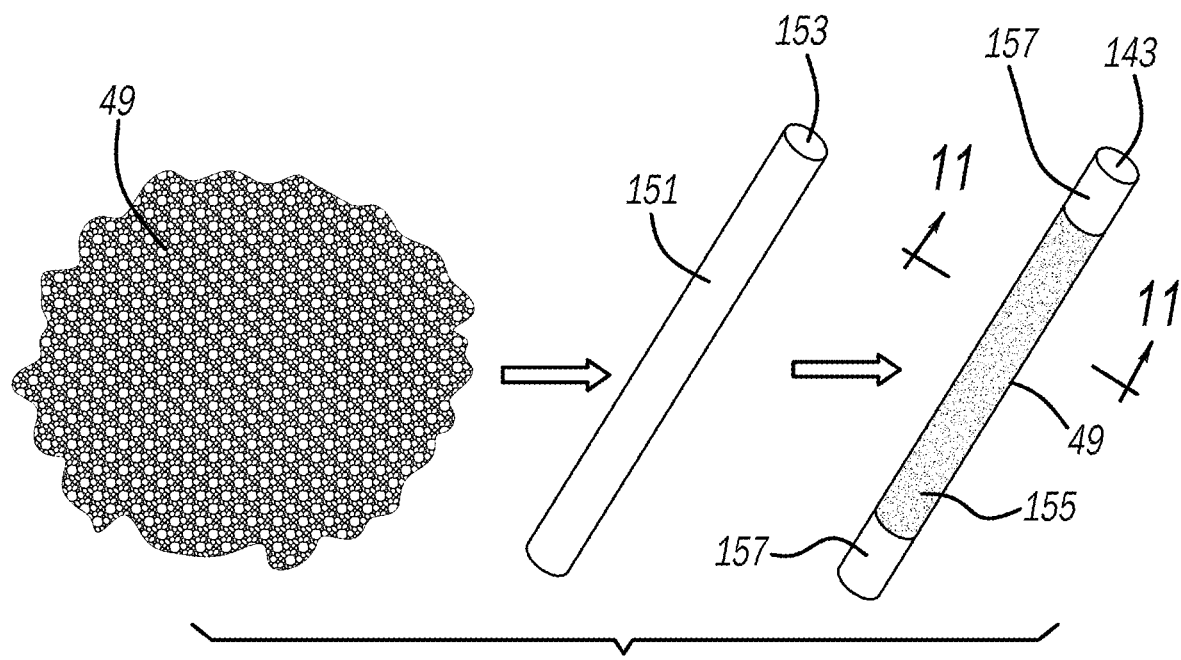
FIG. 10 is a series of perspective views showing a second manufacturing process to make the anode of the present electrode apparatus.
Figure 11:
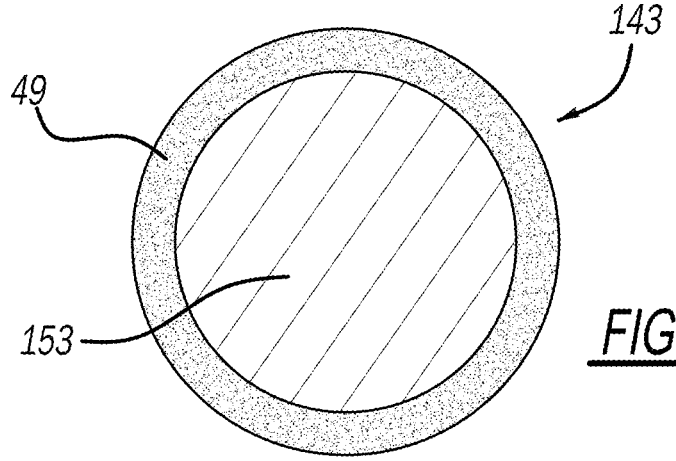
FIG. 11 is a cross-sectional view, taken along line 11-11 of FIG. 10, showing the anode of the present electrode apparatus.

A first method of manufacturing and structure of the present anode 43 is shown in FIGS. 8 and 9. Plasma activated carbon 49 includes a binder material and is pressed and heated to form a unitary and uniform, solid rod with the activated carbon and binder composition evenly spread throughout the entire cross-sectional area from end-to-end. FIGS. 10 and 11 show another manufacturing process and construction of an anode 143 wherein a layer of activated carbon 49, intermixed with a binder material, is coated or otherwise affixed to an outer diameter surface 151 of a conductive and corrosion resistant metallic rod 153, such as copper, stainless steel, nickel or an alloy thereof, which has a generally circular-cylindrical and longitudinally elongated shape. Preferably, the coated rod assembly of anode 143 is only coated at a middle area 155 of rod 153 such that end sections 157 do not have activated carbon 49 thereon. This advantageously allows easier and more effective electrical coupling of the uncoated end sections 157 to the electrical connector.

Figure 12:
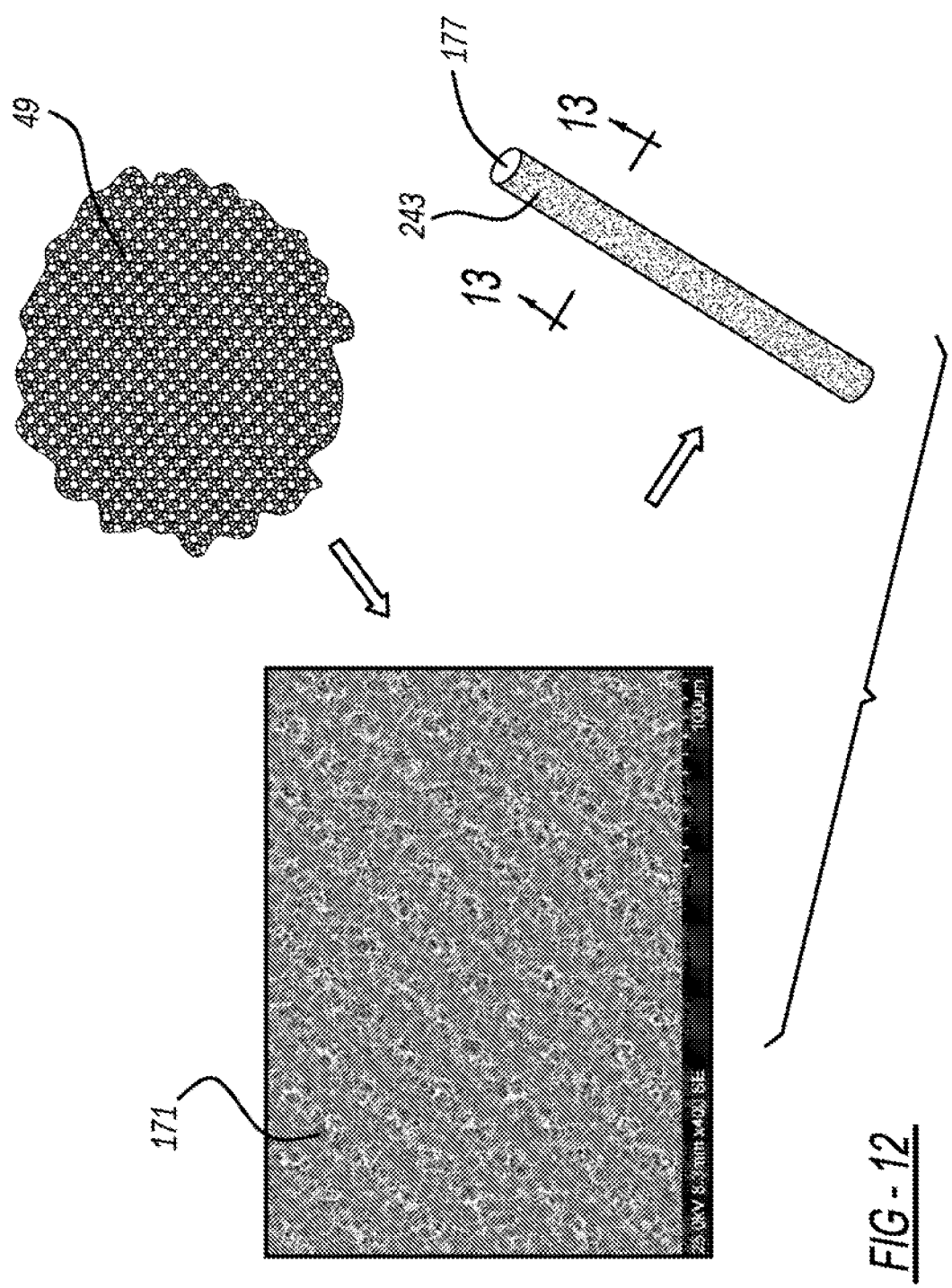
FIG. 12 is a series of perspective views showing a third manufacturing process to make the anode of the present electrode apparatus.
Figure 13:
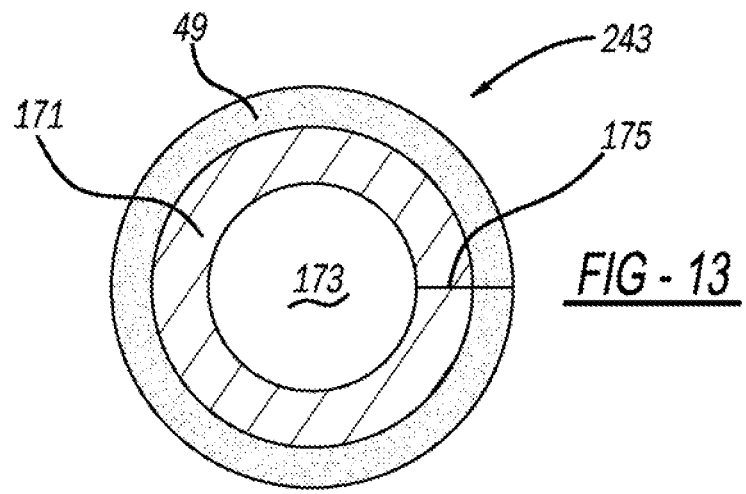
FIG. 13 is a cross-sectional view, taken along line 13-13 of FIG. 12, showing the anode of the present electrode apparatus.

A third manufacturing process and configuration for anode 243 can be observed in FIGS. 12 and 13. First, a foamed metallic sheet or foil 171 is provided. Foamed foil 171 is preferably a nickel foam with a surface density of about 346 g/m$^2$ and a porosity greater than or equal to 95 percent, with 80-110 pores per inch and an average hole diameter of about 0.25 mm. One such nickel foam foil can be obtained from MTI Corporation. It should be appreciated, however, that other metallic foam or, less preferably, unfoamed metallic sheets may be employed.

Activated carbon material, preferably intermixed with a binder, is then deposited, coated or otherwise attached to an outer porous surface of metallic foam foil 171 in a generally flat state. In one example, activated carbon 49 is mixed into a slurry and pressed into the open pores of metallic foam foil 171, which is in a flat state. The assembled activated carbon slurry and foam is then heated at approximately 60-100° C. to dry. An exemplary binder maybe of a cellulose type. Subsequently, the foil and activated carbon assembly is then coiled, rolled or bent into a circular-cylindrical shape with a hollow center 173 with an edge seam 175 attached together to form a complete cross-sectional circle. Optionally, end caps 177 are fastened to both opposite ends of the coiled anode 243 to prevent fluid flow through the hollow center 173. Any of these anode configurations 43, 143 and 243 may be interchangeably used in any of the industrial or residential apparatuses disclosed herein.

Figure 14:
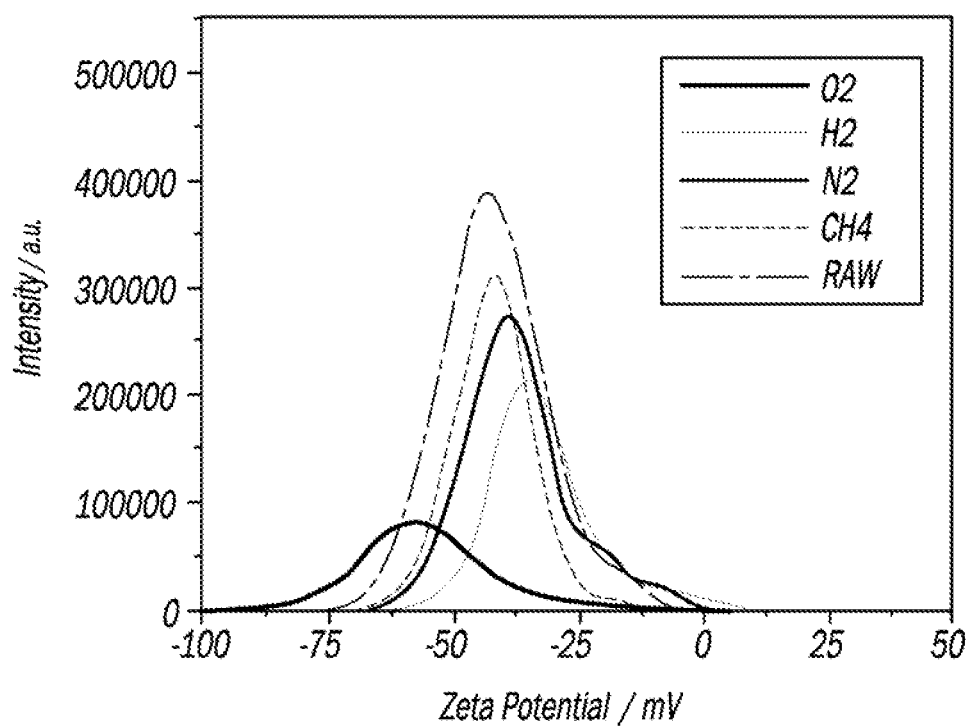
FIG. 14 is a graph showing a Zeta potential of biochar used in the anode of the present electrode apparatus.

FIG. 14 illustrates a zeta potential of the activated carbon. Use of different plasma gas precursors such as $CH_4$, $O_2$, $H_2$ and $N_2$ may be employed in the plasma activation of the carbon to efficiently modulate the surface electropotential of the activated carbon and facilitate contaminant molecule absorption. This allows for tuning or shifting of the surface area potential of the activated carbon so it can be tailored for specific contaminant materials to be absorbed most effectively. In the present example, the use of $H_2$ during the plasma activation is best suited for PFAS adsorption into the anode in the present apparatus.

While various embodiments have been disclosed, it should be appreciated that additional variations of the electrode apparatus and method are also envisioned. For example, additional or different hardware components may be used although certain of the present advantages may not be fully realized. An anode made of porous metals or other electrically conductive materials can be also used. While certain electrode and pipe shapes have been disclosed it should be appreciated that alternate shapes may be used (for example, octagonal, oval or other cross-sectional shapes that create a non-uniform electric field) although all of the present advantages may not be fully achieved. It is also noteworthy that any of the preceding features may be interchanged and intermixed with any of the others. Accordingly, any and/or all of the dependent claims may depend from all of their preceding claims and may be combined together in any combination. Variations are not to be regarded as a departure from the present disclosure, and all such modifications are entitled to be included within the scope and sprit of the present invention.

The invention claimed is:

1. A method for removing a polarized molecule in a drinking water fluid, the method comprising:
   (a) supplying a voltage of 3-40 volts to an anode, the anode comprising at least one of: (i) an elongated rod comprising an electrically conductive porous material through an entire cross-sectional area of the rod, or (ii) porous activated carbon on an outside of a solid metal and elongated rod;
   (b) creating a non-uniform electric field between the anode and a cathode;
   (c) flowing the drinking water fluid within a gap between a cathode and the anode, the cathode surrounding at least a majority of the anode, which are longitudinally elongated in parallel directions and in a primary direction of flow of the drinking water fluid through the gap;
   (d) causing the polarized molecule in the drinking water fluid to move to the anode with the assistance of step (b) without causing a corresponding electric current flow;
   (e) trapping the polarized molecule in pores of the anode; and
   (f) removing the anode, after step (e), for replacement or cleaning of the polarized molecules.

2. The method of claim 1, wherein the electrically conductive porous material of (a)(i) comprises plasma activated carbon having a surface area greater than 600 m$^2$/g.

3. The method of claim 1, wherein the electrically conductive porous material of (a)(i) comprises plasma activated carbon.

4. The method of claim 1, wherein the cathode circumferentially surrounds the anode, there is no chemical reaction to the polarized molecule as it is removed from the drinking water fluid, an electrically coupled end of the anode projects past an end of the cathode, and the rod of the anode is manufactured as a unitary and uniform solid rod comprising the porous material which comprises an activated carbon intermixed with a binder throughout the entire cross-sectional area from end-to-end of the rod.

5. The method of claim 1, wherein the cathode and the anode are attached to a water faucet, and the removing the polarized molecule includes removing PFAS molecules from the drinking water fluid, and the rod of the anode only has the porous material at a middle area such that an end section of the rod is electrically coupled to an electrical connector.

6. The method of claim 1, wherein the flowing the drinking water fluid is through an industrial water treatment piping system to which the anode and the cathode are attached, the system comprising a contaminated supply reservoir, an electrode-based precipitator including the anode and the cathode, a water pump, sensors, and pipes, and the removing the polarized molecule includes removing PFAS molecules from the drinking water fluid.

7. The method of claim 1, wherein:
   the cathode is longitudinally elongated and substantially cylindrical;
   the gap is cylindrical and surrounds the anode;
   the anode has an outer diameter less than half of an inner diameter of the cathode with the gap being therebetween;
   the anode is entirely internal to the cathode; and
   the rod comprises a foamed metal.

8. The method of claim 1, further comprising:
   electrically connecting an end of the cathode to an electrical ground;

wherein the removing the polarized molecule includes removing PFAS molecules from the drinking water fluid by driving or pulling the PFAS molecules toward the anode without additional filtering; and wherein a size of the cathode differs from a size of the anode to create the non-uniform electric field therebetween.

9. The method of claim 1, further comprising:

the removing the polarized molecule includes removing at least one of: benzene, carbon dioxide or sulphur dioxide, from the drinking water fluid by driving or pulling the polarized molecule toward the anode without additional filtering; and electrically connecting an end of the cathode to an electrical ground;

wherein a size of the cathode differs from a size of the anode to create the non-uniform electric field therebetween.

10. The method of claim 1, further comprising supplying electricity to the anode from a battery.

11. The method of claim 1, wherein the porous material includes a plasma activated carbon, and the anode comprises the plasma activated carbon, further comprising an adapter with a threaded coupling configured for attachment to a residential drinking water faucet, the adapter including the anode and the cathode therein, and a distal end of the cathode including longitudinally accessible holes to allow the drinking water fluid to flow therethrough.

12. A method for removing a polarized molecule in a fluid, the method comprising:
(a) supplying 3-40 volts to an anode, the anode comprising at least one of: (i) an electrically conductive porous material, or (ii) plasma activated carbon;
(b) creating an electrical potential difference between the anode and a cathode;
(c) flowing the fluid within a gap between a cathode and the anode, the fluid including drinking water, the cathode surrounding at least a majority of the anode;
(d) causing the polarized molecule in the fluid to move to the anode with the assistance of step (b) without causing a corresponding electric current flow and without causing a chemical reaction in the polarized molecule;
(e) adsorbing the polarized molecule, which comprises PFAS, in pores in the anode; and
(f) wherein the cathode is longitudinally elongated and substantially cylindrical;
  (i) the gap is cylindrical and surrounds the anode;
  (ii) the anode and the cathode are concentric;
  (iii) the anode has an outer diameter less than half of an inner diameter of the cathode with the gap being therebetween; and
  (iv) a longitudinal length of the anode is less than a longitudinal length of the cathode.

13. The method of claim 12, wherein the anode includes the electrically conductive porous material, and the anode comprises a rod which only has the porous material or plasma activated carbon at a middle area such that an end section of the rod is electrically coupled to an electrical connector.

14. The method of claim 12, wherein:
the anode includes the electrically conductive porous material, and the anode comprises a rod which only has the porous material or plasma activated carbon at a middle area such that an end section of the rod is electrically coupled to an electrical connector; and a size of the cathode differs from a size of the anode to create a non-uniform electric field therebetween.

15. The method of claim 12, wherein the cathode and the anode are attached to a residential drinking water faucet, and the anode is located entirely within the cathode, and the removing the polarized molecule includes removing the PFAS molecules from the drinking water, further comprising an adapter with a threaded coupling attaching to the residential drinking water faucet, the adapter including the anode and the cathode therein, and a distal end of the cathode including longitudinally accessible holes to allow the drinking water to flow therethrough.

16. The method of claim 12, wherein the flowing the fluid is through an industrial water treatment piping system to which the anode and the cathode are attached, the system comprising a contaminated supply reservoir, an electrode-based precipitator including the anode and the cathode, a water pump, sensors, and pipes, and the removing the polarized molecule includes removing the PFAS molecules from the fluid, and the anode comprising a rod including a foamed metal.

17. The method of claim 12, wherein:
the anode comprises an elongated metallic rod having a middle area coated with the plasma activated carbon and with an uncoated end section which is electrically coupled to an electrical connector.

18. The method of claim 12, wherein the removing the polarized molecule includes removing the PFAS molecules from the fluid by driving or pulling the PFAS molecules toward the anode without additional filtering, and the anode is removable after the polarized molecule is adsorbed into the electrically conductive porous material or the plasma activated carbon material of the anode without creating electrolysis.

19. The method of claim 12, further comprising supplying electricity to the anode from a battery.

20. The method of claim 12, wherein the anode includes the plasma activated carbon, having a surface area greater than 600 $m^2/g$, on an outside of a solid metal core.

21. The method of claim 12, wherein the anode includes the porous material, which comprises a foamed metallic material having a porosity greater than or equal to 95% and 80-110 pores per inch.

22. A method for removing a polarized molecule, the method comprising:
(a) supplying a voltage between an anode and a cathode, the anode comprising at least one of: (i) an electrically conductive porous material, or (ii) plasma activated carbon material on an outside of a solid metal core, the plasma activated carbon material having a surface area greater than 600 $m^2/g$;
(b) creating a non-uniform electric field between the anode and the cathode without creating a chemical reaction and electrolysis;
(c) flowing drinking water within a gap between a cathode and the anode, the cathode surrounding at least a majority of the anode;
(e) coupling threads of an adapter to a drinking water faucet, the adapter including the anode and the cathode therein, and a distal end of the cathode including longitudinally accessible holes to allow the drinking water to flow therethrough;
(f) trapping the polarized molecule from the drinking water in the material of the anode;
(g) the anode and the cathode removing at least one of the polarized molecules comprising: (a) PFAS, (b) benzene, (c) carbon dioxide, or (d) sulphur dioxide, from the water flowing through the gap without causing an electric current flow between the anode and the cathode, and without causing a chemical reaction; and (h) the anode being removable after the polarized molecules are adsorbed into the electrically conductive porous material or the plasma activated carbon material of the anode, and the anode being configured for replacement or cleaning after removal.

23. The method of claim 22, wherein the anode includes the porous material, which comprises a foamed metallic material having a porosity greater than or equal to 95% and 80-110 pores per inch.

24. The method of claim 22, further comprising:
the faucet being a residential drinking water faucet; and
a battery connected to the anode;
the anode being entirely internal to the cathode; and
the removing the polarized molecules including driving or pulling the polarized molecule toward the anode without additional filtering.

25. The method of claim 22, further comprising:
the cathode being longitudinally elongated and substantially cylindrical;
surrounding the anode with the gap which is cylindrical;
the anode having an outer diameter less than half of an inner diameter of the cathode with the gap being therebetween;
supplying 3-40 volts to the anode;
the anode further comprising an elongated metallic rod having a middle area coated with the plasma activated carbon and with an uncoated end section; and
electrically coupling the uncoated end section to an electrical connector.

26. The method of claim 22, wherein the polarized molecules comprise PFAS.

27. A method for removing a polarized molecule in a fluid, the method comprising:
(a) supplying a voltage of 3-40 volts, between an anode and a cathode, the anode comprising a porous material;
(b) creating a non-uniform electric field between the anode and the cathode;
(c) flowing the fluid within a gap between a cathode and the anode, the fluid including drinking water;
(d) the cathode surrounding at least a majority of the anode; and
(e) causing the polarized molecule in the fluid to move to the anode with the assistance of step (b) without causing a corresponding electric current flow or electrolysis, the polarized molecule including PFAS.

28. The method of claim 27, wherein the anode comprises at least one of: (i) an elongated rod comprising the porous material which is an electrically conductive porous material through an entire cross-sectional area of the rod, or (ii) the porous material comprises a porous activated carbon on an outside of a solid metal and elongated rod.

29. The method of claim 27, wherein the porous material of the anode comprises a porous metallic foam and activated carbon.

30. The method of claim 27, further comprising:
flowing the fluid through a residential drinking water faucet; and
the supplying the voltage is from a battery connected to the anode;
the anode being entirely internal to the cathode; and
removing the polarized molecule by driving or pulling the polarized molecule toward the anode without additional filtering.

31. The method of claim 27, further comprising:
the cathode being longitudinally elongated and substantially cylindrical;
surrounding the anode with the gap which is cylindrical;
the anode having an outer diameter less than half of an inner diameter of the cathode with the gap being therebetween;
supplying 3-40 volts to the anode;
the anode further comprising an elongated metallic rod having a middle area coated with the porous material which comprises plasma activated carbon and with an uncoated end section; and
electrically coupling the uncoated end section to an electrical connector.

* * * * *